455-619 AU 233 EX
FIP8106 OR 3,196,274

EXAMINER
230

15? ?0

July 20, 1965 J. A. GIORDMAINE 3,196,274

LIGHT BEAM DEMODULATOR

Filed Dec. 12, 1961

INVENTOR
J. A. GIORDMAINE
BY
Sylvan Sherman
ATTORNEY

United States Patent Office 3,196,274

Patented July 20, 1965

3,196,274

LIGHT BEAM DEMODULATOR

Joseph A. Giordmaine, Millington, N.J., assignor to Bell Telephone Laboratories, Incorporated, New York, N.Y., a corporation of New York Filed Dec. 12, 1961, Ser. No. 158,790

2 Claims. (Cl. 250—199)

This invention relates to signal detectors and, in particular, to means for demodulating an amplitude-modulated light beam.

The advent of the optical maser or "laser" has stimulated much recent interest in techniques of communications by way of light beams. Such interest is evidenced, for example, by a news report published in the September 15, 1961 issue of Electronics, volume 34. pages 20 to 21. However, together with the opening up of this new frequency range for communications has come the realization that many of the well-known techniques and structrues commonly used at the lower frequency ranges are no longer suitable. Accordingly, new techniques and associated structures in certain areas must be devised. One such area relates to the demodulation of an amplitude-(intensity) modulated light beam.

For the purposes of illustration in the following discussion, reference shall be made to "light" or electromagnetic radiation in the "optical" range. It is to be understood that such terms are intended to include infrared frequencies, visible frequencies and ultraviolet frequencies above the visible frequency range. The only requirement imposed upon the system by the invention is that there be a photoemissive surface capable of responding to the radiant energy.

It is anticipated that in an optical communications system the intelligence bearing signal, such as might be derived from a television camera, would be used to modulate an intermediate microwave frequency carrier. One or more of such modulated intermediate frequency carriers would, in turn, be used to modulate a light beam. The demodulation of the light beam then consists of first rederiving one or more intermediate frequency carriers which themselves are modulated and then subjecting them individually to a second demodulation process to obtain the signal intelligence.

It should be noted that the intermediate frequency carriers used initially to modulate the light beam and the intermediate frequency carriers derived from the demodulation process need not be at the same frequency. The invention to be described in greater detail hereinafter is specifically concerned with the demodulation of a light beam in order to obtain an intermediate frequency carrier having a frequency that is preferably lower than the corresponding modulating intermediate frequency carrier.

It is, accordingly, the broad object of this invention to demodulate an amplitude-modulated light beam.

As is known, when light that has been modulated by a microwave signal impinges upon the photosensitive cathode of a phototube, the latter produces a microwave modulated electron stream. In such an arrangement the phototube can be compared to the diode detector of a radio frequency receiver. However, since it is anticipated that the modulating frequency used in connection with an optical communications system may be in the order of thousands of megacycles per second, a light beam detector operating in this manner requires a phototube capable of producing current in the kilomegacycle range and capable of coupling this current to an external circuit.

This, in general, can be done by conventional phototubes up to perhaps 1000 megacycles per second. The use of higher modulating frequencies, however, requires a microwave phototube of special design. (See the Consolidated Quarterly Status Report No. 11 of the Solid-State Electronics Laboratory, Stanford University, Stanford, California.) The present invention seeks to avoid this obstacle.

It is, therefore, a more specific object of this invention to derive from an amplitude-modulated light beam an intermediate frequency carrier signal whose frequency is in the range below 1000 megacycles.

A second suggested demodulator utilizes a second locally generated light source having a frequency different than the frequency of the modulated light beam. When both light beams are applied to the phototube, photomixing occures producing amplitude modulation of the emitted stream of photoelectrons at the difference frequency. The phototube in this latter arrangement functions as the mixer of a super-heterodyne receiver. This technique poses difficulties in that it requires a second source of monochromatic coherent light whose frequency must be highly stabilized since deviations as little as a billionth of one per cent produce large deviations at the difference frequency.

In accordance with the invention, demodulation of an amplitude-modulated light beam is effected by simultaneously exposing the photoemissive surface of a phototube to optical and microwave radiation. The components of the optical radiation separated in frequency by an amount $\Delta F$ as, for example, a carrier in a sideband, beat together at the photoemissive surface to produce a photocurrent component at the difference frequency $\Delta F$. The intensity of the photocurrent, however, depends upon the work function of the photoemissive surface which, in accordance with the invention, is varied periodically by the microwave electric field at a rate $\Delta F+\Delta f$ (or $\Delta F-\Delta f$). This variation occurs, in part, through the photoelectric Schottky effect. The microwave radiation, applied in this way, modulates the photocurrent at the microwave frequency $\Delta F+\Delta f$ (or $\Delta F-\Delta f$). Beating between the difference frequency $\Delta F$ and the work-function modulation frequency gives rise to a current component at frequency $\Delta f$ and represents a type of double detection. The intermediate frequency $\Delta f$ is selected so as to permit the use of prior art vacuum tube components and conventional circuit techniques. The device may thus be used to demodulate light having modulation frequency componets too high to permit direct utilization of the photocurrent at the modulating frequency.

It is an advantage of the invention that the output frequency $\Delta f$ can be selected independently of the modulating frequency $\Delta F$. The usual requirement in a heterodyne receiver that the modulating frequency be much less than the intermediate frequency is, therefore, not a limitation in a heterodyning arrangement in accordance with the invention. Thus, modulating frequencies of the order of $10^{12}$ cycles per second can be used notwithstanding the fact that the intermediate frequency $\Delta f$ is of the order of only several hundred megacycles or less. As indicated above, there is also modulating intelligence on the frequency $\Delta F$. The bandwidth associated with the intelligence modulation, however, needs to be small compared to $\Delta f$.

These and other objects and advantages, the nature of the present invention, and its various features, will appear more fully upon consideration of the illustrative embodiment now to be described in detail in connection with the accompanying drawings, in which.

Figure 1:
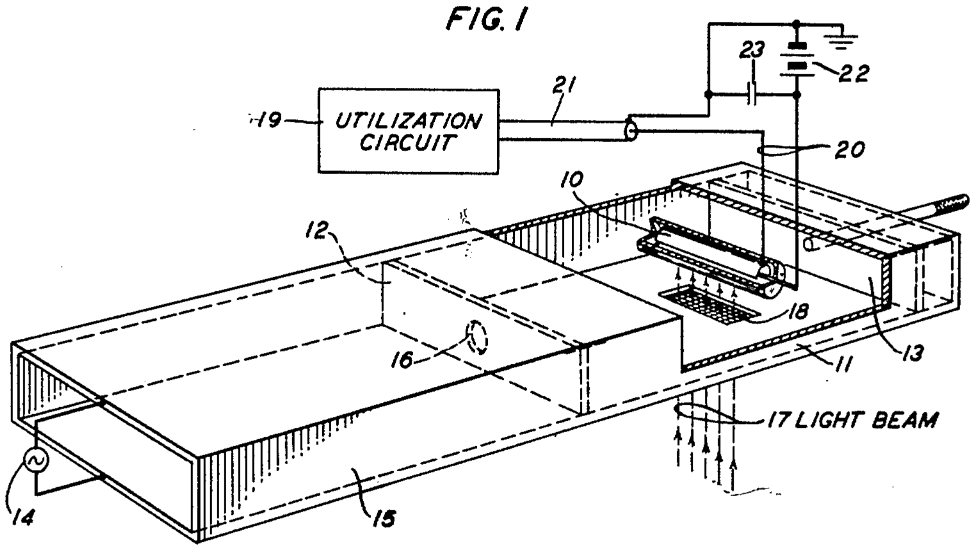
FIG. 1 is a perspective view of an embodiment of the invention.

In the illustrative embodiment of the invention shown in FIG. 1, a phototube detector 10 is located in a conductively bounded cavity 11. The latter comprises a section of rectangular waveguide terminated at both ends. One of the terminations 12 is fixed. The other termination 13 is an adjustable piston used to tune cavity 11.

Wave energy at the local oscillator frequency is electromagnetically coupled to cavity 11 from a source 14 by way of rectangular waveguide 15 and an aperture 16 in cavity wall 12. Source 14 can be any one of the many types of conventional microwave generators, comprising, for example, either a klystron, a magnetron, a parametric oscillator or an Esaki diode oscillator and associated traveling wave microwave amplifiers.

Amplitude-modulated light 17, derived from a distant light source (not shown), simultaneously enters cavity 11 through a second, screened, aperture 18 in one of the walls of the cavity and impinges upon the photo-emissive surface of phototube 10.

Output current from phototube 10 is coupled to a utilization circuit 19 (which, typically, comprises one or more amplifiers, filters, a modulation detector and a load) by way of conductive leads 20 and coaxial cable 21. Means for biasing phototube 10, comprising the parallel combination of a source of constant potential 22 and a bypass capacitor 23, are inserted in one of the leads.

In operation, a beam of amplitude-modulated light at frequency $F_c$ is directed through the screened aperture 18 onto the photoemissive surface of phototube 10. The surface of phototube 10 comprises a suitable material that is sensitive to radiant energy over a range of frequencies which includes the carrier frequency $F_c$ and its sidebands.

For purposes of explanation, it is assumed that the light is amplitude modulated at a microwave frequency $\Delta F$. The resulting sideband components $F_{sb}^-$ and $F_{sb}^+$ and the light carrier at frequency $F_c$ are illustrated in FIG. 2A, in which the two sidebands are shown symmetrically disposed about the carrier frequency $F_c$ and separated therefrom by the modulating frequency $\Delta F$.

As explained above, the sideband components $F_{sb}^-$ and $F_{sb}^+$ are themselves modulated and have sideband components associated with them. However, the latter sidebands extend over a frequency range that is small compared to the frequency of the components $F_{sb}^-$ and $F_{sb}^+$ and, hence, need not be considered for the purposes of explanation. In the following discussion a double sideband system in which the optical carrier frequency $F_c$ is transmitted along with the sideband frequencies is assumed. However, the techniques of the invention are equally applicable to a single sideband system or to a suppressed carrier system since the light carrier frequency can be added to the signal locally and the demodulation process carried out in accordance with the principle of the invention.

Figures 2A, 2B, 2C, 2D:
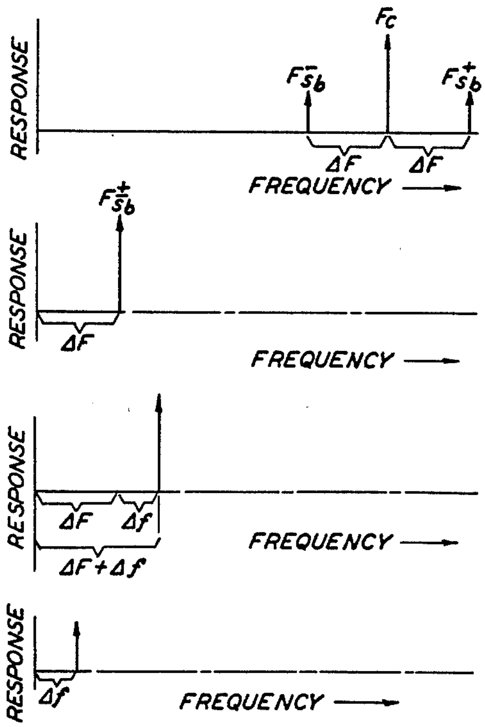
FIGS. 2A, 2B, 2C and 2D show, for purposes of illustration, the various frequency components generated by the phototube under the influence of the incident amplitude-modulated light beam and the microwave energy.

The sidebands $F_{sb}^+$ and $F_{sb}^-$ beat with the carrier frequency $F_c$ at the photoemissive surface to produce a photo-electron current at the difference frequency $\Delta F$, as illustrated in FIG. 2B. While this in itself is a demodulation process, the difference frequency $\Delta F$ produced might typically be in the order of tens or hundreds of kilomegacycles per second. Assuming current at these frequencies could be coupled out of the phototube, their amplification and further utilization would require the use of microwave circuit components.

In accordance with the principles of the invention, however, a second heterodyning step is brought about by introducing into cavity 11 microwave energy at a frequency which differs from $\Delta F$ by a relatively small amount $\Delta f$. While the photoemissive surface does not itself respond directly to the microwave energy, the latter modulates the work function of the photoemissive surface, thereby modulating the amplitude of the photocurrent that is emitted by the photoemissive surface of phototube 10 in response to the light beam 17. The microwave energy, as indicated above, is derived from a source 14, and coupled to cavity 11 by way of waveguide 15 and aperture 16.

For most efficient operation, cavity 11 is tuned, by means of tuning piston 13, to be resonant at the frequency of the microwave energy which can be either $\Delta F+\Delta f$ or $\Delta F-\Delta f$. The phototube is advantageously placed within the cavity in a region of maximum electric field intensity with its photoemissive surface normal to the direction of the electric field vectors. For a cavity excited in the $TE_{101}$ cavity mode, the phototube is advantageously placed approximately midway between the narrow walls of cavity 11 and midway between the end terminations 12 and 13 with its photoemissive surface parallel to the wide cavity walls.

Under the influence of the microwave electric field the photoelectron current at the difference frequency $\Delta F$ is modulated at frequency $\Delta F+\Delta f$ (or $\Delta F-\Delta f$) and produces a second difference frequency current component at frequency $\Delta f$. The relationship between the sideband frequency and the microwave energy frequency is illustrated in FIG. 2C. FIG. 2D shows the difference frequency $\Delta f$. Considered together, FIGURES 2A through 2D show, step by step, the double heterodyning process in accordance with the invention. However, because of the range of frequencies involved, the FIGURES 2A through 2D are not drawn to scale.

Current at the intermediate carrier frequency $\Delta f$ flows out of phototube 10 by way of leads 20 and coaxial cable 21 to the utilization circuit 19 for further amplification and ultimate utilization. By selecting the intermediate carrier frequency in the frequency range between 100 to 500 megacycles per scond (the VHF and UHF range) the utilization circuit can be composed of conventional vacuum tube devices.

Maximum modulation at the microwave rate is obtained when the sensitivity of the photoemissive surface is changing most rapidly as a function of the wavelength of the light beam. This point of maximum slope occurs for most photoemissive surfaces substantially midway between the point of maximum sensitivity and the threshold wavelength. Accordingly, a phototube is selected and the bias adjusted to satisfy these preferred operation conditions. For light having a wavelength of 6940 Angstrom units, a phototube having an S–3 photosurface of silver-rubidium oxide-rubidium produces satisfactory results.

In a typical embodiment of the invention operating at optical frequencies and modulated at approximately $10^{12}$ cycles per second, from 0.1 to 1.0 watt of microwave power is used. With a cavity Q of 1000, an electric field of the order of 100 volts per centimeter is produced in the region of the photoemissive surface. An output intermediate carrier frequency in the order of 100 to 500 megacycles per second is typical.

In all cases it is understood that the above-described embodiment is illustrative of only one of the many possible specific arrangements which can be devised in accordance with the principle of the invention. For example, cavity 11 can assume any other shape in accordance with well-established principles and can be excited in any mode capable of being supported in such cavity. More generally, the microwave energy can be applied to the phototube in one of the propagating modes in an untuned section of wavepath or the photoemissive surface can be exposed to microwave radiation derived from a radiating antenna. Similarly, a photomultiplier tube can be used rather than a simple phototube in order to obtain gain at the intermediate carrier frequency. Thus, numerous and varied other arrangements can readily be devised in accordance with these principles by those skilled in the art without departing from the spirit and scope of the invention.

What is claimed is:

1. A light demodulator comprising a photoemissive surface responsive to radiant energy over a range of frequencies within the optical range; an optical frequency carrier having a carrier frequency $F_c$ within said range and modulated by an intermediate frequency carried ΔF which bears modulation intelligence of a prescribed frequency; a local oscillator for providing wave energy at a frequency different than said intermediate frequency carrier by an amount $\Delta f$, where $\Delta f$ is larger than said prescribed frequency and less than 1000 megacycles per second; said photoemissive surface being simultaneously exposed to a beam of said modulated optical frequency carrier and to local oscillator wave energy; and means for extracting wave energy from said demodulator at said difference frequency $\Delta f$.

2. A light demodulator comprising a conductively bounded cavity tuned to a given frequency; means for coupling wave energy at said given frequency into said cavity; a phototube having a photoemissive surface disposed within said cavity in a region of substantial electrical field intensity with said surface oriented in a direction perpendicular to the direction of said electric field; means for exposing said surface to a monochromatic optical beam; said optical beam being amplitude-modulated by an intermediate frequency carrier bearing modulation intelligence of a prescribed bandwith; said carrier being at a frequency different than said given frequency by an amount $\Delta f$ that is larger than said bandwidth; and means for extracting photoelectron current from said tube at said difference frequency $\Delta f$.

References Cited by the Examiner

UNITED STATES PATENTS

| | | | |
|---|---|---|---|
| 2,206,072 | 7/40 | Barthelemy | 325—442 |
| 2,265,784 | 12/41 | Von Baeyer | 250—199 |
| 2,978,652 | 4/61 | Thomas | 332—3 |

OTHER REFERENCES

Forrester et al.: Physical Review, vol. 99, No. 6, Sept. 15, 1955, pp. 1691–1700.

Ahlstrom: Review of Sci. Instr., vol. 30, No. 7, July 1959, pp. 592–593.

Forrester: Journal Opt. Soc. Amer., vol. 51, No. 3, March 1961, pp. 253–259.

Vogel et al.: Electronics, vol. 34, Nov. 10, 1961, pp. 81–85.

DAVID G. REDINBAUGH, *Primary Examiner.*